(12) United States Patent
Fridd

(10) Patent No.: US 7,219,963 B2
(45) Date of Patent: May 22, 2007

(54) BACK SUPPORT FOR PLACING THE BACK OF A USER IN TRACTION

(75) Inventor: George Fridd, 40 Lawn Cresent, Kew, Richmond, Surrey (GB) TW9 3NS

(73) Assignee: George Fridd (GB)

( * ) Notice: Subject to any disclaimer, the term of this patent is extended or adjusted under 35 U.S.C. 154(b) by 0 days.

(21) Appl. No.: 11/040,696

(22) Filed: Jan. 21, 2005

(65) Prior Publication Data
US 2006/0175889 A1    Aug. 10, 2006

(51) Int. Cl.
*A61F 5/37*    (2006.01)
(52) U.S. Cl. .................. 297/464; 128/876; 606/241
(58) Field of Classification Search ............... 297/464, 297/465, 485, 284.4, DIG. 6; 2/912, 917, 2/919, 1, 69, 456; 606/2.41; 128/869, 874, 128/875, 876
See application file for complete search history.

(56) References Cited

U.S. PATENT DOCUMENTS

| | | | | |
|---|---|---|---|---|
| 1,356,365 A | * | 10/1920 | Hosmer | 297/464 |
| 2,633,125 A | * | 3/1953 | Yellin | 602/36 |
| 3,960,145 A | * | 6/1976 | Scarbrough | 602/2 |
| 4,487,201 A | | 12/1984 | Clambarella | |
| 4,541,425 A | * | 9/1985 | Yetter, Jr. | 128/876 |
| 4,639,946 A | * | 2/1987 | Koenig | 297/465 |
| 4,807,937 A | * | 2/1989 | Harrigan | 297/465 |
| 4,881,528 A | | 11/1989 | Scott | |
| 4,981,148 A | | 1/1991 | Fuller | |
| 5,123,427 A | | 6/1992 | Watt | |
| 5,149,173 A | * | 9/1992 | Jay et al. | 297/284.9 |
| 5,205,814 A | | 4/1993 | Lundrigan | |
| 5,333,623 A | | 8/1994 | Fuller | |
| 5,829,840 A | * | 11/1998 | Goeckel | 297/464 |
| 6,082,826 A | * | 7/2000 | Moreno | 297/464 |

FOREIGN PATENT DOCUMENTS

| | | |
|---|---|---|
| FR | 2787399 A1 | 6/2000 |
| GB | 2401036 | 3/2004 |
| WO | WO 95/22948 | 8/1995 |

* cited by examiner

*Primary Examiner*—Peter R. Brown

(57) ABSTRACT

A back support (6) comprising a first support element (7) adapted to be mounted on a seat back (3), and a second support element (21) adapted to be mounted to the back of a user, the elements (7, 21) each being provided with securing means (7', 24) to secure the support elements (7, 21) together when the support elements (7, 21) are placed together. The arrangement is such that, in use, the first support element (7) supports the second support element (21) so that the back of a user of the back support (6) is in traction. The means to secure the elements together comprises a hook-and-loop-type pad on each support element (7, 21) or a tongue and groove arrangement.

24 Claims, 7 Drawing Sheets

BACK SUPPORT FOR PLACING THE BACK OF A USER IN TRACTION

BACKGROUND

The present invention relates to a back support and particularly but not exclusively relates to a back support for use with a seat such as a vehicle seat for placing the back of a user in traction.

One-in-three people suffer from lower back pain at some point in their lives and for some it is a major cause of disability and restriction of their daily lives.

For chronic lower back pain sufferers whose job is sedentary and often involves an hour or two in their car on a daily basis, back pain can be a significant problem. It is important that, when a person is seated, the "in curve" in the lower back, known as the lumbar lordosis, is maintained. This curve is one of three curves in the spine and together these curves act to absorb forces placed upon the spine and share the load of the body weight of the person. Maintaining the lumbar lordosis is made easier by modern car seats and office chairs having lumbar supports which usually consist of an outwardly curved region of the lower seat back.

During treatment of lower back pain, osteopaths, chiropractors and physiotherapists may perform "traction" to the injured area to relax the corresponding muscle groups, improve fluid dynamics, reduce compressive effects of the injury and reduce the pain perceived by the brain. Traction has been shown to be of considerable benefit during treatment, especially of compression injuries. Unfortunately, anti-compression of the spine is relatively difficult to achieve, as the necessary equipment exists in only a limited number of forms and is often bulky and impractical.

Traction as used herein means the application of pulling or tensile forces to the vertebrae of the back in order to achieve vertical separation of some or all of the vertebrae of the back.

Traction exercises for the neck (or cervical spine), for example, can be achieved with a device which has a chin strap and a strap for the back of the head, both being connected to a wire which runs vertically through a pulley and over the top of a door. On the other side of the door are a series of weights which offering vertical traction to the cervical spine when the user is stood adjacent the door. A whole spine traction device is also on the market and comprises a flat board suspended at 45° between two sides of an "A" frame. The ankles of a user are fixed to one end of the board and the board is tilted so that the head of the user is at the lower end of the board to traction the whole spine at 45° from the ankles. These traction devices are not suitable for a seated user.

BRIEF DESCRIPTION OF THE INVENTION

According to a first aspect of the invention there is provided a back support for a seat the back support comprising a first support element adapted to be mounted on a seat back, and a second support element adapted to be mounted to the back of a user, the arrangement being such that, in use, the first support element supports the second support element so that the back of the user is in traction, wherein the first support element is movably mounted on the seat back, the back support further comprising a winch mechanism to which the first support element is attached, the winch mechanism being operative to move the first support element relative to the seat back to increase or decrease the traction applied to the back of the user, whilst the user is sat on the seat. Preferably the first and second support elements are integral.

DESCRIPTION OF THE DRAWINGS

The present invention may be carried into practice in various ways, but embodiments will now be described by way of example only with reference to the accompanying drawings in which.

DETAILED DESCRIPTION OF THE INVENTION

Figure 1:
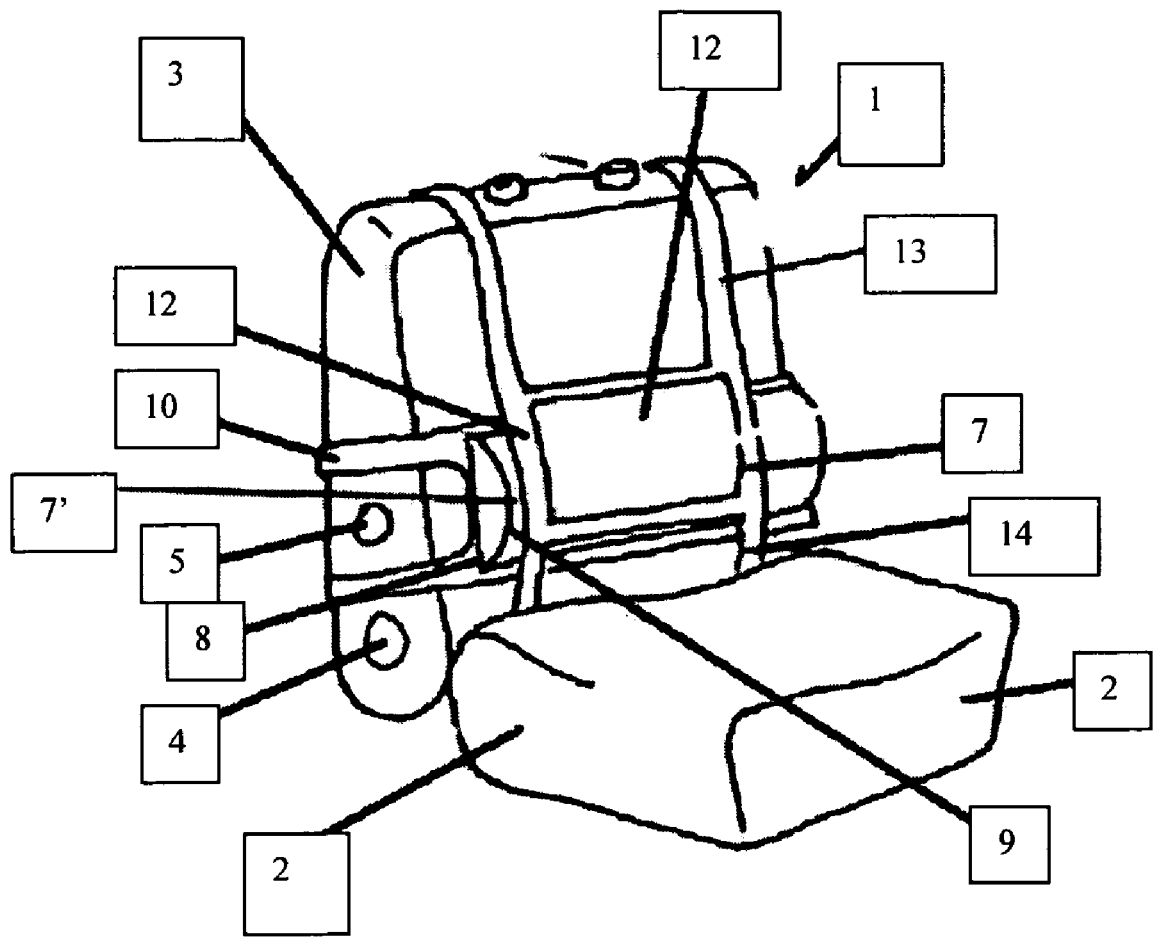
FIG. 1 is a perspective view from the front of a car seat on which part of the back support in accordance with the present invention is mounted.
Figure 2:
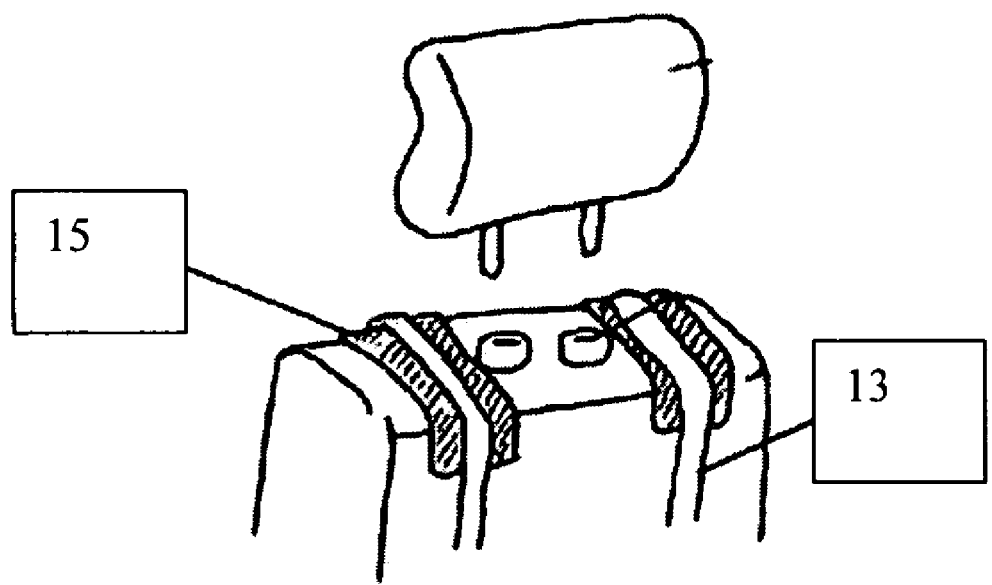
FIG. 2 is an enlarged perspective view of an upper region of the car seat of FIG. 1.
Figure 3:
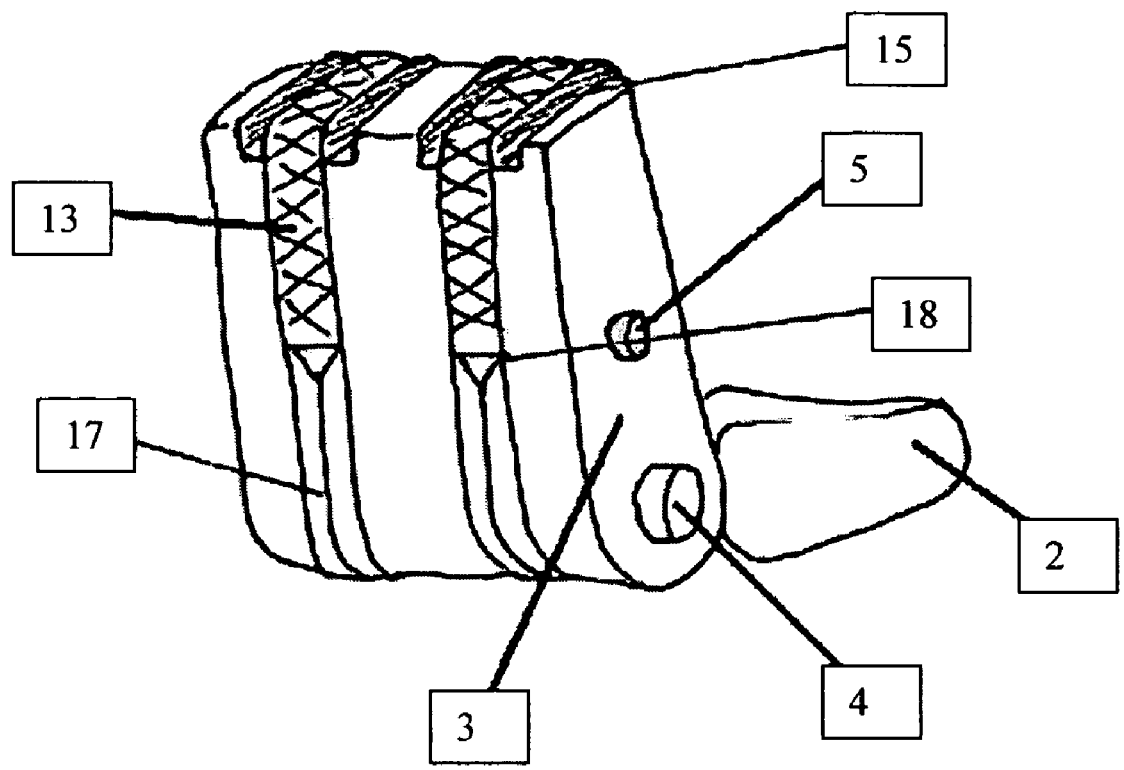
FIG. 3 is a perspective view from the rear of the car seat of FIGS. 1 and 2.
Figure 4:
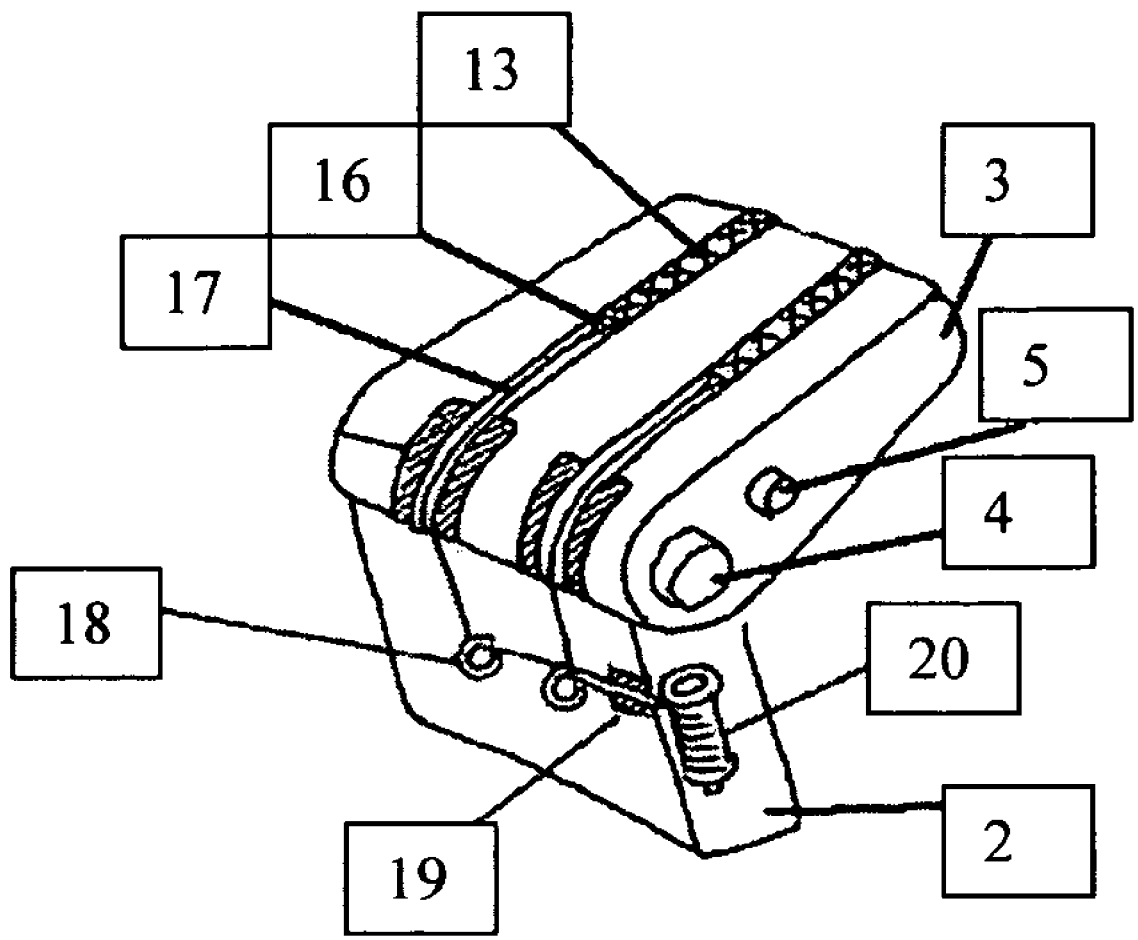
FIG. 4 is a perspective view from the base of the car seat of FIGS. 1 to 3.

According to a first aspect of the invention there is provided a back support for a seat the back support comprising a first support element adapted to be mounted on a seat back, and a second support element adapted to be mounted to the back of a user, the arrangement being such that, in use, the first support element supports the second support element so that the back of the user is in traction, wherein the first support element is movably mounted on the seat back, the back support further comprising a winch mechanism to which the first support element is attached, the winch mechanism being operative to move the first support element relative to the seat back to increase or decrease the traction applied to the back of the user, whilst the user is sat on the seat.

Preferably the first and second support elements are integral.

Alternatively the first and second support elements are separate elements and are each provided with means to secure the support elements together.

Preferably the means to secure the elements together comprises a hook and loop pad on each support element.

Alternatively the means to secure the elements together comprises a region on one support element formed with a plurality of horizontal grooves, and a region on the other support element formed with a plurality of horizontal lugs, the lugs in use being received within the grooves.

Preferably the first support element comprises an oblong of material which extends, in use, across the lower part of the back of the seat.

Preferably the first support element is made from a foam material.

Preferably the first support element comprises a cushion.

Preferably the first support element is convex so as to extend outwardly when mounted on the seat back. The convexity is such as to provide lumbar support to a user of the back support.

Preferably a rear face of the first support element is backed with a low friction material which, in use, is in contact with the seat back.

Preferably the first support element is mounted on the seat back using straps which extend at least partially around the seat back and which are attached to the winch mechanism.

Preferably additional straps may be provided which extend horizontally around the seat back.

Preferably the back support further comprises a fastening mechanism by which the length of the vertically extending straps can be adjusted.

Preferably the fastening mechanism comprises a hook and loop pad on each end of each strap. Alternatively the fastening mechanism comprises a buckle at one end of each strap, the other end of the respective strap passing through and being releasably clamped by the buckle.

Preferably the winch mechanism is electrically operated. Alternatively the winch mechanism is manually operated.

Preferably the first support element is provided with at least one heating element.

Preferably the back support is adapted to be connected to a power source to power the winch mechanism and/or the heating element.

If the back support is used on a vehicle seat, preferably the power source comprises the cigarette lighter socket of the vehicle.

Preferably runners are provided for mounting at the top of the seat back, the straps, in use, resting on the runners. Preferably the runners are formed from a plastics material.

Preferably the second support element comprises a waist strap adapted to be secured around the waist of a user.

Preferably the second support element further comprises a planar portion extending from the waist strap.

Preferably the planar portion is formed from a semi rigid material.

Preferably the planar portion is formed from a fabric material.

Preferably the securing means is provided on the planar portion which, in use, is parallel with the back of the user.

Preferably the waist strap is provided with adjustment means to allow the length of the waist strap to be adjusted for users of different sizes.

According to a second aspect of the invention there is provided a first support element for use with the back support of the first aspect of the invention.

According to a third aspect of the invention there is provided a second support element for use with the back support of the first aspect of the invention.

According to a fourth aspect of the invention there is provided a seat having a back support in accordance with the first aspect of the invention.

Preferably the seat is a vehicle seat.

Other aspects of the present invention may include any combination of the features or limitations referred to herein.

Referring initially to FIG. 1, a standard car seat 1 comprises a squab 2 and back 3. The angle of the back 3 relative to the squab 2 can be adjusted by a mechanism mounted in the squab 2 and operated using adjuster wheel 4. The seat back 3 may have lumbar adjustment which is operated using wheel 5 to vary the depth of the lower region of the seat back 3.

Referring also to FIGS. 2 to 6, a back support indicated generally at 6 comprises a first support element 7 and a second support element 21.

The first support element 7 comprises a cushion 7' having a planar rear surface 8 and a convex outer surface 9. The rear surface 8 is attached to two, parallel, spaced apart straps 10 which extend horizontally around the seat back so as to mount the cushion 7' on the seat back 3. The straps are of adjustable length to allow the cushion 7' to be mounted on seat backs of different sizes. A length adjustment mechanism is provided and may comprise a Velcro™ (hook-and-loop-type fastener) arrangement or a buckle as is well known in the art. The cushion 7', in use, is mounted on the lower region of the seat back 3 and it will be noted that this region is adjacent the lower back of a user of the seat and, in particular is adjacent the lumbar lordosis.

The cushion 7' is made of a foam core having a fabric outer surface. The rear surface 8 is provided with a region of low friction fabric.

The first support element 7 further comprises a traction pad 12 formed from a square or rectangle of a fabric material and located, in use, adjacent the convex outer surface 9 of the cushion 7'. The fabric of the traction pad 12 is flexible so as to allow the pad 12 to deform to follow the contours of the cushion 7'. The front surface 12' of the pad 12 is made from Velcro™.

The pad 12 is provided with upper and lower vertical straps 13, 14 respectively. The straps 13, 14 extend around the top of the seat back 3 and around the squab 2 and are joined together at the rear of the seat 1 to mount the pad 12 on the seat back 3. The straps 13, 14 are made from flat canvas to avoid cutting into the seat 1. To further prevent damage to the seat back 3 the straps 13, 14 run over hard plastics runners 15 provided at the top and bottom of the seat back 3.

A height adjustment mechanism is provided so that the pad 12 can be moved up and down the seat back 3 to a predetermined position.

The height adjustment mechanism comprises a stainless steel hook 16 woven in to the end of each strap 13, 14. Each hook 16 is connected to a respective steel wire 17, the wires 17 extending behind the rear of the seat and through steel guide rings 18 attached to the underside of the seat squab 2 as can be seen from FIG. 4. The wires 17 pass through a tubular guide sheath 19 made from hard plastic, also attached to the underside of the seat squab 2. The ends of the wires 17 are wrapped around the barrel of an electric winch 20, which is mounted on the squab 2 of the seat 1 and is powered via a suitable power source which may be provided by a vehicle cigarette lighter socket. Alternatively the winch 20 may be wired into the vehicle electrical system.

The winch 20 is controlled by a suitable switch which may be mounted on or adjacent the seat 1, or on the dashboard of the vehicle so as to be easily accessible to a user of the support 6.

Figure 5:
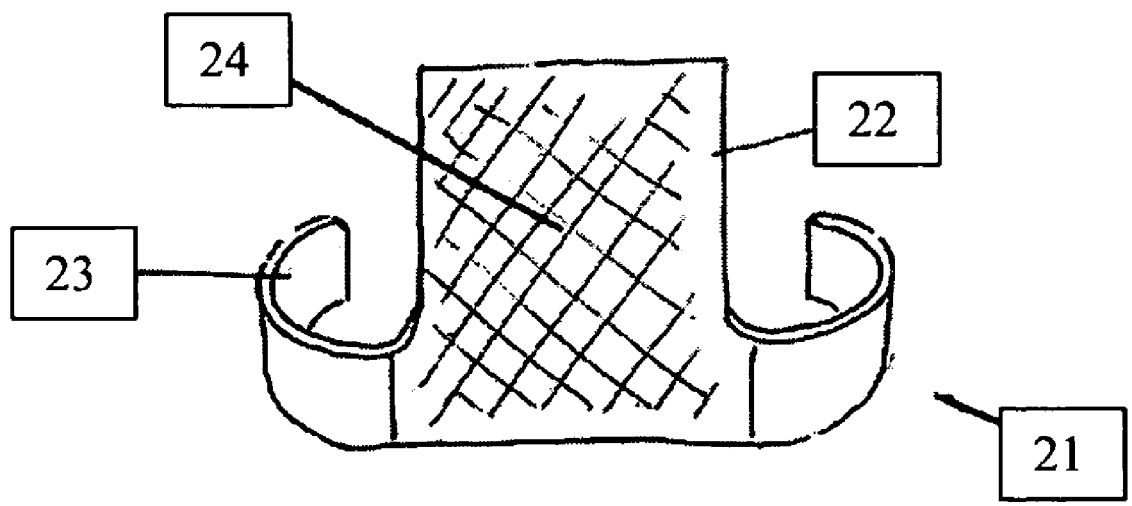
FIG. 5 is a perspective view from the rear of another part of the back support in accordance with the present invention.
Figure 6:
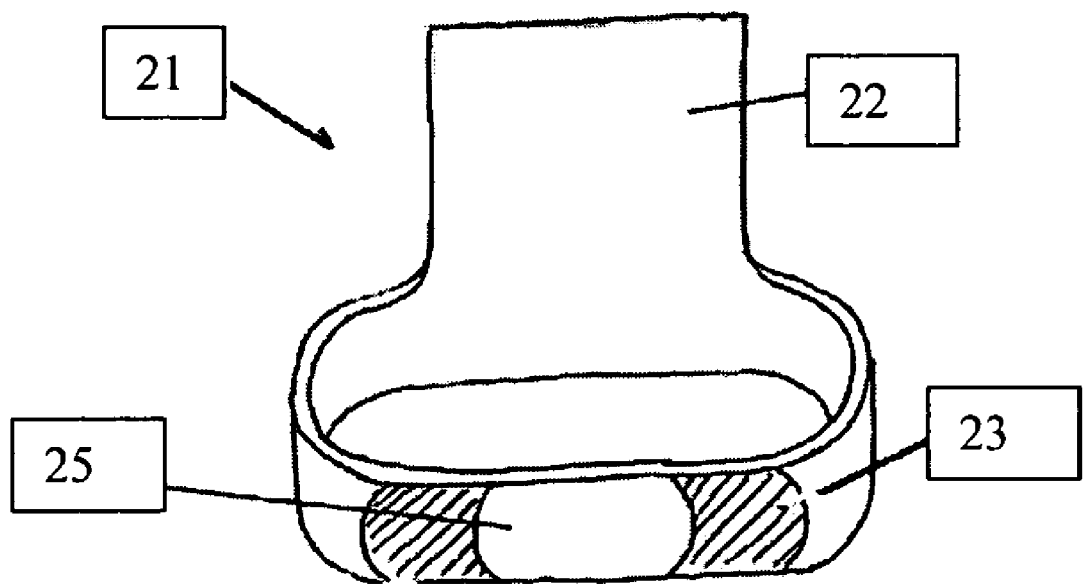
FIG. 6 is a perspective view from the front of the part of the back support of FIG. 5.
Figure 7:
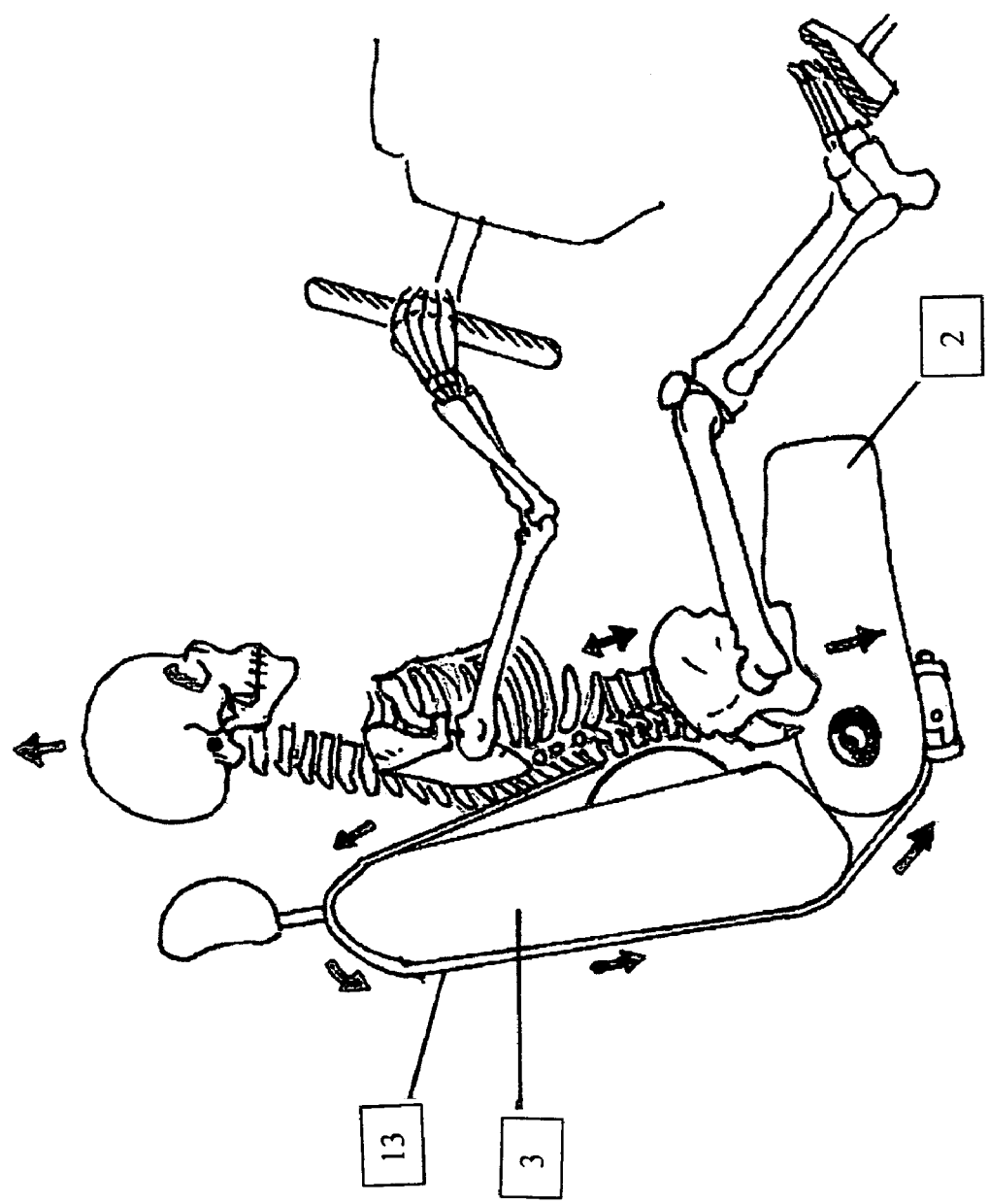
FIG. 7 is a schematic representation of the invention showing how the invention provides traction to the back of a seated user (shown in skeletal form). Tension is provided to the back via the straps (3). Arrows indicate the general direction of forces applied by the device.

Referring now to FIGS. 5 and 6, the second support element 21 of the back support 6 is adapted to be secured to a user of the back support 6. The support element 21 comprises a planar rectangular upper portion 22 which is made from a partially rigid material such as Neoprene which is sufficiently rigid to prevent the upper portion 22 bending when unsupported. The rear surface of the upper portion 22 comprises a Velcro™ (hook-and-loop-type fastener) pad 24.

Two waist straps 23 extend from a lower part of the upper portion 22. The ends of the straps 23 are provided with a securing mechanism such as Velcro™ 25 or a buckle or clasp or the like so that the ends of the straps 23 can be joined together.

In use, the second support element 21 is secured to the lower back of a user by passing the straps 23 around the waist of the user and securing the straps 23 together using the Velcro™ (hook-and-loop-type fastener) or buckle securing mechanism. The upper portion 22 is parallel with the back of the user and the Velcro™ pad 24 faces outwardly of the back of the user. The waist straps 23 should be sufficiently tight, when secured together, that the support element 21 cannot move up or down the back of the user.

The user can then use the height adjustment mechanism of the first support element to adjust the height of the traction pad 12 on the seat back 3. The pad 12 should be adjusted so as to be at a height in which the Velcro™ pad 12' on the first support element 7 is aligned with the Velcro™ pad 24 on the second support element 21 when the user sits on the car seat 1 in a normal position.

Research has suggested that a normal seating position comprises a seat back angle of 110 degrees such that the pelvis of the user is located at the back of the seat 1 so that the clutch pedal can be fully depressed without the left hip moving forward, as this creates unwanted rotation through the pelvis and the lower back. It may take several attempts for the person to ensure they are in the normal driving position and the Velcro™ (hook-and-loop-type fastener) pad 12' is aligned with the Velcro™ pad 24 on the support element 21. As the user leans back on the seat back 3, the Velcro™ pads 12', 24 adhere to one another and the second support element 21 is relatively fixed to, and cannot move vertically relative to, the first support element 7.

Once this is achieved, the person need not repeat the process when subsequently entering or exiting the vehicle. This is because the waist straps 23 at the front of the second support element 21 can simply be disconnected such that when the user exits the vehicle, the support element 21 remains secured to the first support element 7 and the seat back 3. Also if the user needs to exit the car seat relatively quickly, such as in an accident, the user can undo the straps 23 along with the vehicle seatbelt to get out of the vehicle, rather than over coming the resistance of the Velcro™ pads 12' and 24. Leaving the second support element 21 in situ also means other users can drive the vehicle without removing the back support 6.

Once the user is in position with the Velcro™ pads 12', 24 secured together, the height adjustment mechanism can be operated to move the traction pad 12 upwardly along the seat back 3. This is achieved by activating the electric winch 20. The upward movement of the pad 12 also causes an upward movement of the second support element 21 because this is secured to the Velcro™ pad 12' of the first support element 7. The second support element 21 is secured to the back of the user and thus the upward movement of the traction pad 12 causes an upward movement of the back of the user. This decompresses the vertebra of the back of the user and thus tractions the back of the user.

The back support 6 is not intended to elevate the user off the seat squab 2, but is intended to remove a proportion of the downward force of the body mass which is above the compressed/injured area of the spine. For example, if the downward force of the mass of the person above the injured area is 60 kgs, then the traction device is designed to reduce this to between 42 and 36 kgs. This will reduce the compression to the injured area of the back of the user. The back support 6 is preferably used to remove between 30 to 40% of the downward force on the compressed area of the spine.

When the back support 6 is used in this way this achieves relaxation of associated spinal muscles which may be "guarding" the injured area by gently stretching them, and reduction of the compressive forces on the lumbar spine so as to cause separation of the lumbar vertebrae (bones).

This in-turn creates greater fluid exchange between muscles, synovial cavities (joint spaces), intervertebral discs (disc shapes cushions between the bones) and ligaments.

A timing device may be provided to control the winch 20 so as to slowly release the traction force after a predetermined period of time such as, for example, two to three minutes. The winch 20 can subsequently be reactivated to create a gentle pumping effect at the injured area of the back of the user. The therapeutic pumping of the traction-release cycle of the winch 20 further releases compression of the lower back and enhances fluid exchange between the anatomical structures.

Maintenance of the lumbar lordosis is achieved due to the cushion's 7 convex front surface 9 which is congruous with the lumbar lordosis. The attachment of the Velcro™ pads 12', 24 ensures that whilst driving, the person does not slump forward into poor posture; their lumbar lordosis thus being preserved against the cushion 7'.

Part of the back support 6 may be provided with heating elements (not shown) which may be, for example, woven into the traction pad 12. Further relaxation of the spinal muscles will be gained through the warming effect of the heating elements. Rhythmic movement and traction have been shown to send nerve impulses to the part of the brain which houses "pain memory"—the hippocampus. This area is stimulated with each painful movement which enhances the pain perceived, but the pain-free range of traction movement reduces the amount of "pain" stimulation to the hippocampus by flooding it with "non painful stimulation", reducing the amount of pain perceived.

It will be appreciated that any suitable means could be provided to secure the second support element 21 to the first support element 7 to resist relative vertical movement therebetween. Such means could comprises a region on one support element 7, 21 having horizontal grooves, and a region on the other support element 7, 21 having horizontal lugs. In use the lugs are received in the grooves to prevent vertical movement between the support elements 7, 21.

The first support element and the second support element 21 may alternatively be permanently joined together so as to comprise a single integral component.

The height adjustment mechanism used to adjust the height of the pad 12 to traction the back of the user could comprise any suitable mechanism including, for example, a hand operated winch mechanism such as a ratchet and pawl operated using a lever adjacent the seat squab 2. Alternatively a hydraulic or gas pump could be provided to actuate pistons to adjust the vertical position of the pad 12.

It will be appreciated that the back support 6 could be used in any type of vehicle or indeed in other seats as may be found in offices or domestic buildings.

The invention claimed is:

1. A back support for a seat the back support comprising a first support element adapted to be mounted on a seat back, and a second support element adapted to be mounted to the back of a user, the arrangement being such that, in use, the first support element supports the second support element through materials allowing detachable attach-ability so that the back of the user is in traction, wherein the first support element is movably mounted on the seat back, the back support further comprising a winch mechanism to which the first support element is attached, the winch mechanism being operative by the user whilst the user is sat on the seat to move the first support element relative to the seat back to increase or decrease the traction applied to the back of the user.

2. A back support according to claim 1 wherein the first and second support elements are separate elements and are each provided with securing means to secure the support elements together.

3. A back support according to claim 2 wherein the means to secure the elements together comprises a hook and loop pad on each support element.

4. A back support according to claim 1 wherein the first support element comprises an oblong of material which extends, in use, across the lower part of the back of the seat.

5. A back support according to claim 1 wherein the first support element is made from a foam material.

6. A back support according to claim 1 wherein the first support element comprises a cushion.

7. A back support according to claim 1 wherein the first support element is convex so as to extend outwardly when mounted on the seat back to provide lumbar support to a user of the back support.

8. A back support according to claim 1 wherein a rear face of the first support element is backed with a low friction material which, in use, is in contact with the seat back.

9. A back support according to claim 1 wherein the first support element is mounted on the seat back using straps which extend at least partially around the seat back and which are attached to the winch mechanism.

10. A back support according to claim 9 wherein a fastening mechanism is provided by which the length of the straps can be adjusted.

11. A back support according to claim 10 wherein the fastening mechanism comprises a hook and loop fastener pad on each end of each strap.

12. A back support according to claim 10 wherein the fastening mechanism comprises a buckle at one end of the strap, the other end of the strap passing through and being releasably clamped by the buckle.

13. A back support according to claim 1 wherein the winch mechanism is electrically operated.

14. A back support according to claim 1 wherein the winch mechanism is manually operated.

15. A back support according to claim 1 wherein the first support element is provided with at least one heating element.

16. A back support according to claims 15 wherein the first support element is adapted to be connected to a power source to power the winch mechanism and/or the heating element.

17. A back support according to claim 16 wherein the power source comprises the cigarette lighter socket of a vehicle.

18. A back support according to claim 1 wherein runners are provided for mounting at the top of the seat back, the straps, in use, resting on the runners.

19. A back support according to claim 1 wherein the second support element comprises a waist strap adapted to be secured around the waist of a user.

20. A back support according to claim 19 wherein the second support element further comprises a planar portion extending from the waist strap.

21. A back support according to claim 20 wherein the planar portion is formed from a semi rigid material.

22. A back support according to claim 20 wherein the planar portion is formed from a fabric material.

23. A back support according to claim 20 wherein the securing means is provided on the planar portion which, in use, is parallel with the first support element.

24. A back support according to claim 19 wherein the waist strap is provided with adjustment means to allow the length of the waist strap to be adjusted for users of different sizes.

* * * * *